United States Patent
Tenneti et al.

(10) Patent No.: US 12,124,841 B2
(45) Date of Patent: Oct. 22, 2024

(54) LIVE FIRMWARE AND CONFIGURATION UPDATES OF MULTI-NODE ALARM SYSTEMS

(71) Applicant: Carrier Corporation, Palm Beach Gardens, FL (US)

(72) Inventors: Rohith Tenneti, Bradenton, FL (US); Antonio Montero, Bradenton, FL (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 56 days.

(21) Appl. No.: 17/980,739

(22) Filed: Nov. 4, 2022

(65) Prior Publication Data

US 2023/0143055 A1  May 11, 2023

Related U.S. Application Data

(60) Provisional application No. 63/278,189, filed on Nov. 11, 2021.

(51) Int. Cl.
*G06F 8/656* (2018.01)
*G06F 11/14* (2006.01)

(52) U.S. Cl.
CPC .......... *G06F 8/656* (2018.02); *G06F 11/1433* (2013.01)

(58) Field of Classification Search
CPC .............................. G06F 8/60; G06F 11/1433
USPC .................................................. 717/120–178
See application file for complete search history.

(56) References Cited

U.S. PATENT DOCUMENTS

| | | | |
|---|---|---|---|
| 6,601,093 B1 | 7/2003 | Peters | |
| 6,918,052 B2 * | 7/2005 | Bouchier | G06F 9/5061 |
| | | | 710/316 |
| 7,133,800 B2 | 11/2006 | Delin et al. | |
| 7,301,455 B2 | 11/2007 | McKenna et al. | |
| 7,483,403 B2 | 1/2009 | Herrmann et al. | |
| 7,602,756 B2 | 10/2009 | Gu et al. | |
| 8,489,779 B2 | 7/2013 | Govindaraju et al. | |
| 9,100,397 B2 | 8/2015 | Li et al. | |

(Continued)

FOREIGN PATENT DOCUMENTS

| | | |
|---|---|---|
| CN | 102215246 A | 10/2011 |
| WO | 2008032014 A1 | 3/2008 |

OTHER PUBLICATIONS

Baumann, Andrew. Dynamic update for operating systems. Diss. UNSW Sydney, 2007. pp. 1-115 (Year: 2007).*
Appavoo, Jonathan, et al. "Enabling autonomic behavior in systems software with hot swapping." IBM systems journal 42.1 (2003): pp. 60-76. (Year: 2003).*

(Continued)

*Primary Examiner* — Satish Rampuria
(74) *Attorney, Agent, or Firm* — CANTOR COLBURN LLP

(57) ABSTRACT

A system and method for performing live firmware and configuration update. A method includes maintaining live operation of network nodes during an update, each of the network nodes including a disk that is divided into a plurality of partitions, a currently running application file is located in a first partition of the network node; and downloading an update file in a common partition of the disk of the network node to be updated. A method may include extracting the update file from the common partition to a second partition of the disc of the network nodes to be updated; and switching the live operation of the network nodes to operate from the currently running application file in the first partition to the update file in the second partition.

16 Claims, 4 Drawing Sheets

(56) References Cited

U.S. PATENT DOCUMENTS

| | | | |
|---|---|---|---|
| 9,230,373 | B2 | 1/2016 | Dziadosz et al. |
| 9,626,180 | B2 * | 4/2017 | Barrat .................. G06F 9/5077 |
| 9,674,781 | B2 | 6/2017 | Szewczyk et al. |
| 9,728,074 | B2 | 8/2017 | Chiarizio et al. |
| 9,762,437 | B2 | 9/2017 | Apte et al. |
| 10,389,736 | B2 | 8/2019 | Dawes et al. |
| 2010/0079278 | A1 | 4/2010 | Suzuki et al. |
| 2014/0052976 | A1 * | 2/2014 | Marino .................. G06F 21/56 713/2 |
| 2015/0256399 | A1 | 9/2015 | Kim et al. |
| 2016/0266894 | A1 * | 9/2016 | Panicker ................. G06F 8/656 |
| 2017/0351584 | A1 * | 12/2017 | Griffith .............. G06F 16/2358 |
| 2020/0249934 | A1 * | 8/2020 | Escofet Via ............ G06F 8/656 |
| 2020/0344133 | A1 | 10/2020 | Dawes et al. |
| 2021/0152517 | A1 | 5/2021 | Dawes et al. |
| 2022/0100490 | A1 * | 3/2022 | Hwang .................. G06F 15/16 |

OTHER PUBLICATIONS

Wood, Timothy, et al. "CloudNet: Dynamic pooling of cloud resources by live WAN migration of virtual machines." IEEE/ACM Transactions On Networking 23.5 (2014): pp. 1568-1583. (Year: 2014).*

Sapuntzakis, Constantine P., et al. "Optimizing the migration of virtual computers." ACM SIGOPS Operating Systems Review 36.SI (2002): pp. 377-390. (Year: 2002).*

Chen, Haibo, et al. "Live updating operating systems using virtualization." Proceedings of the 2nd international conference on Virtual execution environments. 2006. pp. 35-44 (Year: 2006).*

Brasser, Franz Ferdinand, Mihai Bucicoiu, and Ahmad-Reza Sadeghi. "Swap and play: Live updating hypervisors and its application to xen." Proceedings of the 6th Edition of the ACM Workshop on Cloud Computing Security. 2014. pp. 33-44 (Year: 2014).*

* cited by examiner

LIVE FIRMWARE AND CONFIGURATION UPDATES OF MULTI-NODE ALARM SYSTEMS

CROSS-REFERENCE TO RELATED APPLICATIONS

This application claims the benefit of Provisional Application No. 63/278,189 filed Nov. 11, 2021, the disclosure of which is incorporated herein by reference in its entirety.

BACKGROUND

The present disclosure relates to updating network nodes, and more specifically, to performing live firmware updates and configuration updates for multi-node alarm systems.

Performing upgrades of network nodes is a common task to maintain the latest version of an application or provide additional functionality to the network nodes. Often, during the upgrading of network nodes, the functionality of the nodes is limited or completely restricted. Also, each of the nodes in the network is generally required to individually connect to the source of the upgrade which consumes bandwidth as each file is repeated transferred over the network.

BRIEF DESCRIPTION

According to an embodiment, a method for performing live firmware and configuration update is provided. The method comprises maintaining live operation of network nodes during an update, wherein each of the network nodes comprises a disk that is divided into a plurality of partitions, wherein a currently running application file is located in a first partition of the network node; and downloading an update file in a common partition of the disk of the network node to be updated. The method also comprises extracting the update file from the common partition to a second partition of the disc of the network nodes to be updated; and switching the live operation of the network nodes to operate from the currently running application file in the first partition to the update file in the second partition.

In addition to one or more of the features described herein, or as an alternative, further embodiments include verifying the update file in the common partition of the network nodes to be updated.

In addition to one or more of the features described herein, or as an alternative, further embodiments include extracting the file and storing the update file from the common partition to the second partition of the network nodes to be updated, responsive to the verification of the update file in the common partition.

In addition to one or more of the features described herein, or as an alternative, further embodiments include continuing to use the currently running application file in the first partition of the network nodes if the verification of the update file fails.

In addition to one or more of the features described herein, or as an alternative, further embodiments include transmitting a negative acknowledgment to a distribution node of the network nodes to indicate the failure of the verification of the update file in the common partition of the network nodes to be updated.

In addition to one or more of the features described herein, or as an alternative, further embodiments include discovering the nodes comprises obtaining an identifier for each network node in the network and an identifier corresponding to a firmware version for each network node.

In addition to one or more of the features described herein, or as an alternative, further embodiments include authorizing the downloaded file stored in the common partition; and transferring the downloaded files to a partition of the disk based at least in part on the authorization.

In addition to one or more of the features described herein, or as an alternative, further embodiments include verifying the download of the update files on each of the network nodes; and retransmitting the downloaded update file to the network nodes that did not verify the download.

In addition to one or more of the features described herein, or as an alternative, further embodiments include multicasting, in parallel distribution, the update file via a single-entry point into a network of the one or more network nodes.

According to an embodiment, a system for performing live firmware and configuration updates is provided. The system can comprise a client node; and one or more network nodes connected to the client node, wherein one of the network nodes is a distribution node. The one or more network nodes are configured to: maintain live operation of the one or more network nodes during an update, wherein each of the network nodes comprises a disk that is divided into a plurality of partitions, wherein a currently running application file is located in a first partition of the network node; and download an update file in a common partition of the disk; extract the update file from the common partition to a second partition of the disc; and switch the live operation of the one or more network nodes to operate from the currently running application file in the first partition to the update file in the second partition.

In addition to one or more of the features described herein, or as an alternative, further embodiments include one or more network nodes that are configured to verify the update file in the common partition.

In addition to one or more of the features described herein, or as an alternative, further embodiments include one or more network nodes that are configured to extract the file and store the update file from the common partition to the second partition, responsive to the verification of the update file in the common partition.

In addition to one or more of the features described herein, or as an alternative, further embodiments include one or more network nodes that are configured to continue to use the currently running application file in the first partition if the verification of the update file fails.

In addition to one or more of the features described herein, or as an alternative, further embodiments include one or more network nodes that are configured to transmitting a negative acknowledgment to the distribution node to indicate the failure of the verification of the update file in the common partition.

In addition to one or more of the features described herein, or as an alternative, further embodiments include discovering the network nodes comprises obtaining an identifier for each other network node in the network and an identifier corresponding to a firmware version for each other network node.

In addition to one or more of the features described herein, or as an alternative, further embodiments include one or more network nodes that are configured to: authorize the downloaded file stored in the common partition; and transfer the downloaded files to a partition of the disk based at least in part on the authorization.

In addition to one or more of the features described herein, or as an alternative, further embodiments include one or more network nodes that are configured to: verify the download of the update files on each of the network nodes; and retransmit the downloaded update file to the other network nodes that did not verify the download.

In addition to one or more of the features described herein, or as an alternative, further embodiments include a distribution node that is configured to multicast, in parallel distribution, the update file via a single-entry point into a network of the one or more network nodes.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

The technical effects and benefits of the system and method described herein include maintaining a live system during an application update (counter to current systems which require the systems or nodes to be taken offline during the update procedure where the functionality is unavailable until the completion of the update). A live system may be viewed as a system that remains fully operational during each phase of the update process. The ability to maintain a live system may be due, at least in part, by using a multi-partitioned disk for the update procedure.

A detailed description of one or more embodiments of the disclosed system and method are presented herein by way of exemplification and not limitation with reference to the Figures.

Figure 1:
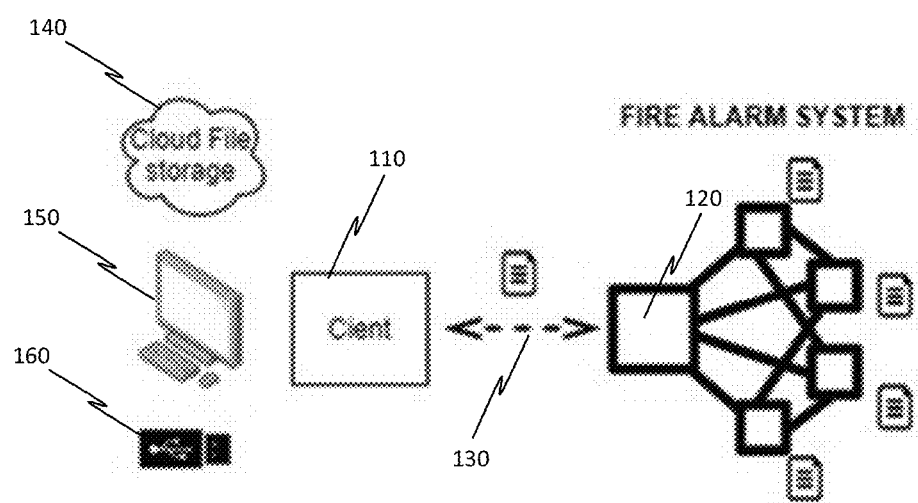
FIG. 1 illustrates an example of a multi-node system for performing live firmware updates in accordance with one or more embodiments of the disclosure.

FIG. 1 depicts an exemplary multi-node system 100 used for performing live firmware and configuration updates in accordance with one or more embodiments of the disclosure. The system 100 includes a client node 110 and one or more network nodes 120. In one or more embodiments of the disclosure, the client node 110 is configured to initiate the update process for updating the network nodes. The client node 110 can include but is not limited to a laptop, PC, or other computing devices. The client node 110 can receive the update file from cloud storage 140, another computing device 150, a portable storage device 160, etc. The client node 110 is also configured to maintain an updated view of the network nodes. The view of the network nodes can include the identifier information for each of the network nodes 120 and the version of firmware that each network node 120 is currently operating.

In one or more embodiments of the disclosure, the network nodes 120 are fire system nodes (e.g., fire panels) or other types of controllers or accessory devices that can be utilized in a fire system. The client nodes 110 can communicate with the network nodes 120 over a network 130. The network(s) 130 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In one or more embodiments of the disclosure, the client node 110 upon connecting to a network node 120, obtains a complete view of the network. The distribution node 120, responsive to a request from the client node 110, can provide a current live view of the network nodes 120. The requests may include a request for firmware or configuration versions information. The client node 110 can connect to any network node 120 in the network 130 for the download phase. In one or more embodiments of the disclosure, the network node 120 that is connected to the client node 110 is a distribution node. The distribution node, which can be a network node 120, can manage the distribution phase of the files for the network by determining which update files should be transmitted to which network nodes 120. For example, if one file needs to go to all the nodes a multicast group transfer will be commenced. Therefore, each file will not be sent to each node multiple times. The topology and the distribution of the update files is optimal.

Network nodes 120 connected to the client node 110 are capable of distributing the relevant files to the other nodes in the network in a reliable and secure manner with a distributed parallel distribution algorithm for optimal use of the network and local node resources. The distribution node, responsive to receiving the update files from the client node 110, may be configured to coordinate with the rest of the network nodes of the network via its own multicast sessions on which network nodes 120 can join the current download/update group session.

In one or more embodiments of the disclosure, the client node 110, such as in a fire alarm system, is capable of automatically discovering all of the nodes in the network. The client node 110 can also be configured to discover the firmware version of each of the nodes of the network. In one or more embodiments of disclosure, responsive to joining the network or starting up, all nodes within the network will distribute its known CPUinfo to the rest of the network via MDNS services. The distribution node can provide a view of the network to client node 110 responsive to receiving a request which can include the version information of each node. The client node 110, responsive to receiving the user configuration, provides the updates to the network for use. The distribution node determines which nodes require such an upgrade or update based on any determined version mismatches. The upgrade can upgrade the readiness status and stats for the fire system nodes.

Figure 2:
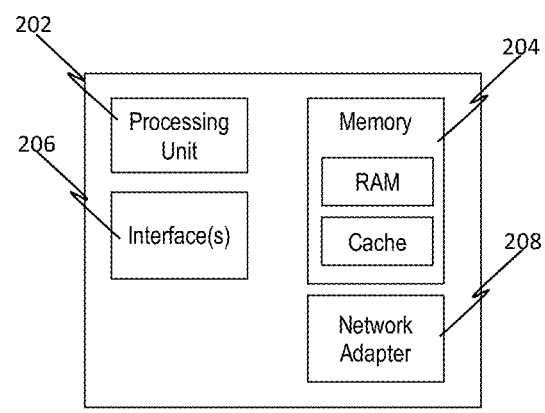
FIG. 2 illustrates an example node in accordance with one or more embodiments of the disclosure.

Referring now to FIG. 2, in which an exemplary node 200, which may be representative of any of the client nodes 120 and/or network nodes 120 of FIG. 1, that is used to implement the embodiments of the present disclosure is shown. Node 200 is only illustrative and is not intended to suggest any limitation as to the scope of use or functionality of embodiments of the invention described herein.

As shown in FIG. 2, node 200 is shown in the form of a general-purpose computing device. The components of node 200 may include, but are not limited to, one or more processors 202, a memory 204, interface 206, and network adapter 208. In one or more embodiments of the disclosure, the processor 202 can include a processor 202 of a general-purpose computer, special purpose computer, or other programmable data processing apparatus configured to execute instruction via the processor of the computer or other programmable data processing apparatus.

Nodes 200 can include a variety of computer system readable media. Such media may be any available media that is accessible by node 200, and it includes both volatile and non-volatile media, removable and non-removable media. Memory 204 can include computer system readable media. The memory 204 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), etc.). Node 200 may further include other removable/non-removable, volatile/non-volatile computer system storage media. The processor 202 and a memory 204 are configured to carry out the operations for the nodes. Each of the network nodes 120 can include a memory or disk for storing applications. Each disk can be divided into logical partitions. The partition allows nodes to operate using different operating systems or creates the appearance of having multiple hard drives.

The memory 204 may include one or more program modules (not shown) such as operating system(s), one or more application programs, other program modules, and program data. Each of the operating systems, one or more application programs, other program modules, and program data or some combination thereof, may include an implementation of a networking environment. The program modules generally carry out the functions and/or methodologies of embodiments of the invention as described herein.

Node 200 may also communicate with one or more external devices through the interface 206 such as a keyboard, a pointing device, a display, etc.; one or more devices that enable a user to interact with node 200; and/or any devices (e.g., network card, modem, etc.) that enable node 200 to communicate with one or more other computing devices.

Still yet, node 200 can communicate with one or more networks such as a local area network (LAN), a general wide area network (WAN), and/or a public network (e.g., the Internet) via network adapter 208. As depicted, network adapter 208 communicates with the other components of node 200. It should be understood that although not shown, other hardware and/or software components could be used in conjunction with node 200. In one or more embodiments, the network nodes 120 include a memory or disk that comprises a multi-partition disk discussed with further reference to FIG. 3. It can be appreciated the node 200 can include other components or modules and is not limited by the components shown in FIG. 2.

Figure 3:
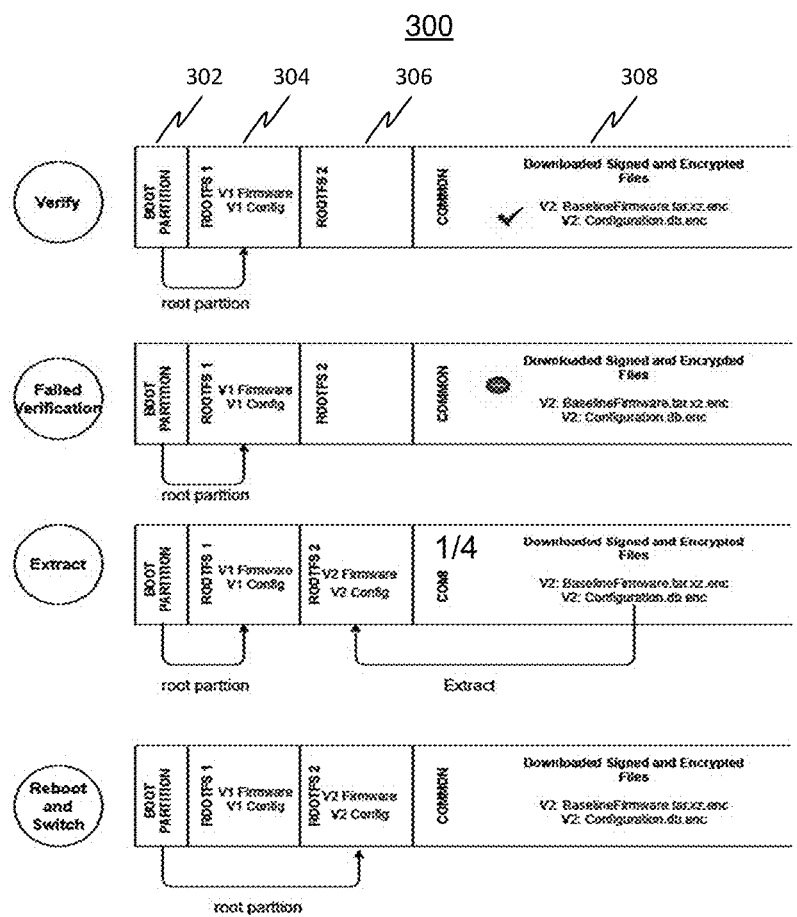
FIG. 3 illustrates an example of the partitions of a disk of a network node in accordance with one or more embodiments of the disclosure.

FIG. 3 depicts an example multi-partition disk 300 of a network node 120 in accordance with one or more embodiments of the disclosure. In one non-limiting example, the multi-partition disk can include four or more partitions. The disk of the network node 120 can include a boot partition 302, a primary partition, that includes the boot loader which is software that is required to start-up and boot the operating system of the computing device or network node 120. Upon start-up, the boot partition 302 access the application, operating system, or firmware in another partition of the disk. In a non-limiting example, the current file that is live and currently running on the network node is "V1 Firmware, V1 Config" and is stored in the partition 304. The disk 300 can include a common partition 308. An update file "V2 Firmware, V2 Config" is downloaded to the common partition 308. In one or more embodiment of the disclosure, the common partition 308 can be used to store the update file during the verification phase. The verification may include verifying the sender of the file, verifying the file itself, using a key to decrypt the file, etc.

In one or more embodiments of the disclosure, if the verification of the downloaded update file in the common partition 308 of the disk fails, the update file is discarded, and the network node 120 can provide a negative acknowledgment to the distribution node. As shown, when the verification fails, the update file is not extracted to the partition 306. In response, the distribution node can resend the update file to the network node to attempt to re-install the update file. The verification process will be performed again. If the verification of the update file is successful, the file can be extracted from the common partition of the disk to another available partition of the disk. During this entire process of installing the update file, the original file remains unmodified in its own partition to allow the network to remain fully functional. Embodiments of the disclosure provide a failsafe to return to the original version because the original file is not being overwritten as it is in conventional techniques.

In one or more embodiments of the disclosure, the update file is extracted from the common partition 308 and is provided to and stored in partition 306. The extraction process includes decrypting the file, decompressing the file, and/or moving the compressed files to a different location for processing. Various extraction techniques can be used to access the update file from the common partition of the node such as using a hash, a credential, or some other key.

Finally, upon successfully installing the update file, the boot partition 302 is switched from partition 304 and points to the second partition 306 to resume operation of the network node 120 using the updated file.

Figure 4:
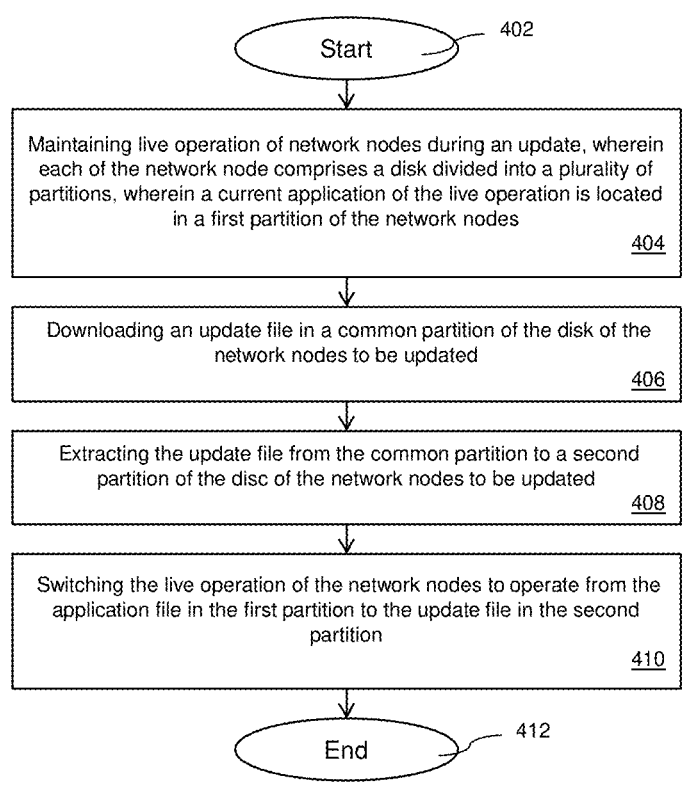
FIG. 4 illustrates a flowchart of an exemplary method for performing live firmware updates in accordance with one or more embodiments of the disclosure.

FIG. 4 depicts a flowchart of a method 400 for performing live firmware and configuration updates in accordance with one or more embodiments of the disclosure. The method 400 may be implemented in a system 100 such as that shown in FIG. 1. The method 400 begins at block 402 and continues to block 404 which provides for maintaining live operation of network nodes during an update, wherein each of the network nodes comprises a disk that is divided into a plurality of partitions, wherein the application file is located in a first partition a disk of the network node. During the update process, each of the network nodes remains operational by using the version of the firmware or application that is stored in the first partition of the disk.

Block 406 downloads an update file in a common partition of the disk of the network node to be updated. In one or more embodiments, a discovery process is performed by a distribution node to obtain an identifier for each network node in the network and an identifier corresponding to a firmware version for each network node.

Block 408 extracts the update file from the common partition to a second partition of the disk of the network nodes to be updated. In embodiments of the disclosure, responsive to verifying the update file in the common partition the files are extracted from the common partition and stored in the second partition of the disk. In some other embodiments of the disclosure, a negative acknowledgment is transmitted to the distribution node to indicate the failure of the verification of the update file in the common partition of the network nodes to be updated. In the event the verification fails, the network nodes continue to use the application file in the first partition.

Block 410 switches the live operation of the network nodes to operate from the application file in the first partition to the update file in the second partition. The method 400 ends at block 412. The process flow diagram of FIG. 4 is not intended to indicate that the operations of the method 400 are to be executed in any particular order, or that all of the operations of the method 400 are to be included in every case. Additionally, the method 400 can include any suitable number of additional operations.

The technical effects and benefits include using a connection to a single-entry point in the network thereby removing the complexity of the utility's need to communicate with the other networked nodes. The technical effects and benefits described herein provide a parallel and reliable method for performing network node updates. The file transfer uses multicasting to increase the upgrade speed and is impacted by the available network bandwidth and not by the number of network nodes in the system. The technical effects and benefits include isolating the upgrade/update communication interface to a single-entry point in the fire network system reduces the cyber security attack surface.

Also, the technical effects and benefits include an auto-recovery feature. In one or more embodiments of the disclosure, the network nodes and the client nodes use a negative acknowledgment (NACK) process to verify the successful download of the application. In addition, the user is not required to reinitiate the process in the event the application download process has failed.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for performing live firmware and configuration update, the method comprising:
sending an update file from a client node to a distribution node, the distribution node serving as a single-entry point into a network of one or more network nodes;
multicasting the update file from the distribution node to the one or more network nodes, the one or more network nodes including a fire alarm system panel;
wherein the one or more network nodes are configured to perform:
maintaining live operation of network nodes during an update, wherein each of the network nodes comprises a disk that is divided into a plurality of partitions, wherein a currently running application file is located in a first partition of the network node;
downloading the update file in a common partition of the disk of the network node to be updated;
extracting the update file from the common partition to a second partition of the disc of the network nodes to be updated;
installing the update file; and
switching the live operation of the network nodes to operate from the currently running application file in the first partition to the update file in the second partition.

2. The method of claim 1, further comprising verifying the update file in the common partition of the network nodes to be updated.

3. The method of claim 2, further comprising extracting the file and storing the update file from the common partition to the second partition of the network nodes to be updated, responsive to the verification of the update file in the common partition.

4. The method of claim 2, further comprising continuing to use the currently running application file in the first partition of the network nodes if the verification of the update file fails.

5. The method of claim 4, further comprising transmitting a negative acknowledgment to a distribution node of the network nodes to indicate the failure of the verification of the update file in the common partition of the network nodes to be updated.

6. The method of claim 1, wherein discovering the nodes comprises obtaining an identifier for each network node in the network and an identifier corresponding to a firmware version for each network node.

7. The method of claim 1, further comprising authorizing the downloaded file stored in the common partition; and
transferring the downloaded files to a partition of the disk based at least in part on the authorization.

8. The method of claim 1, further comprising verifying the download of the update files on each of the network nodes; and retransmitting the downloaded update file to the network nodes that did not verify the download.

9. A system for performing live firmware and configuration updates, the system comprising:

a client node;

the client node configured to send an update file from the client node to a distribution node, the distribution node serving as a single-entry point into a network of one or more network nodes;

the distribution node multicasting the update file from the distribution node to the one or more network nodes, the one or more network nodes including a fire alarm system panel;

wherein the one or more network nodes are configured to:

maintain live operation of the one or more network nodes during an update, wherein each of the network nodes comprises a disk that is divided into a plurality of partitions, wherein a currently running application file is located in a first partition of the network node;

download the update file in a common partition of the disk;

extract the update file from the common partition to a second partition of the disc;

install the update file; and switch the live operation of the one or more network nodes to operate from the currently running application file in the first partition to the update file in the second partition.

10. The system of claim 9, wherein the one or more network nodes are configured to verify the update file in the common partition.

11. The system of claim 10, wherein the one or more network nodes are configured to extract the file and store the update file from the common partition to the second partition, responsive to the verification of the update file in the common partition.

12. The system of claim 10, wherein the one or more network nodes are configured to continue to use the currently running application file in the first partition if the verification of the update file fails.

13. The system of claim 12, wherein the one or more network nodes are configured to transmitting a negative acknowledgment to the distribution node to indicate the failure of the verification of the update file in the common partition.

14. The system of claim 9, wherein discovering the network nodes comprises obtaining an identifier for each other network node in the network and an identifier corresponding to a firmware version for each other network node.

15. The system of claim 9, wherein the one or more network nodes are configured to:

authorize the downloaded file stored in the common partition; and transfer the downloaded files to a partition of the disk based at least in part on the authorization.

16. The system of claim 9, wherein the one or more network nodes are configured to:

verify the download of the update files on each of the network nodes; and retransmit the downloaded update file to the other network nodes that did not verify the download.

* * * * *